Oct. 8, 1968
C. LEACH
3,404,621
OUTDOOR GRILL WITH ADJUSTABLE SPIT
Filed Dec. 12, 1966
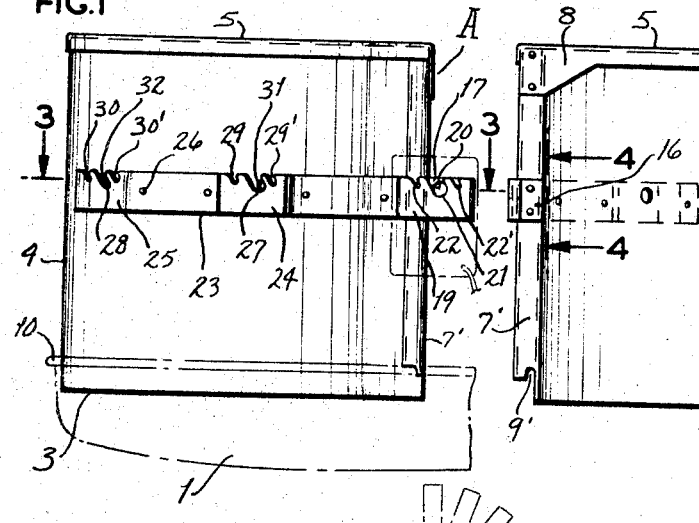
INVENTOR
CHARLES LEACH
BY Ralph N Kalish
ATTORNEY

United States Patent Office 3,404,621
Patented Oct. 8, 1968

3,404,621
OUTDOOR GRILL WITH ADJUSTABLE SPIT
Charles Leach, St. Louis, Mo., assignor to Glaser Products Corporation, St. Louis, Mo., a corporation of Delaware
Filed Dec. 12, 1966, Ser. No. 601,102
14 Claims. (Cl. 99—421)

ABSTRACT OF THE DISCLOSURE

A barbecue grill having a hood with a parti-annular side wall, a first spit support bracket mounted on one end portion of said side wall, a plurality of second spit support brackets provided on the opposite portion of said side wall and being arranged in a spaced apart circumferential manner whereby with the handle end of the spit being received in said first spit support bracket, the opposite end portion may be selectedly received within any one of the second spit support brackets.

Background of the invention

This invention relates in general to outdoor grills, and, more particularly, to such grills having unique support arrangements for spits.

It is an object of the present invention to provide a grill incorporating unique means disposing the food-supporting spit or rod at a predetermined position with respect to the radiant surface of the grill without the necessity of elevating or lowering the entire spit.

It is another object of the present invention to provide an outdoor grill having means for disposing a spit or rod in pre-selected relationship to the radiant surface of the grill, while retaining one end of the spit in a fixed location.

It is a further object of the present invention to provide an outdoor grill of the character stated which integrally embodies means for allowing of disposition of the spit in a multiplicity of positions relative to the radiant surface of the grill, such positions being within the same plane and permitting of support means for detachably receiving the spit driving unit.

It is a still further object of the present invention to provide an outdoor grill having unique multi-positioning means for a spit which may be produced most economically; which conduces to ease of disposition of the spit; and which is durable and reliable in usage.

Other objects and details of the invention will be apparent from the following description, when read in connection with the accompanying drawing (1 sheet), wherein—

FIGURE 1 is a side elevational view of the hood of an outdoor grill constructed in accordance with and embodying the present invention.

FIGURE 2 is a front elevational view of the hood.

FIGURE 3 is a horizontal transverse sectional view taken on the line 3—3 of FIGURE 1.

FIGURE 4 is a vertical view taken on the line 4—4 of FIGURE 2.

FIGURE 5 is a vertical view taken on the line 5—5 of FIGURE 2.

FIGURE 6 is a fragmentary horizontal transverse section taken substantially on the line 3—3 of FIGURE 1 but illustrating another form of bracket for supporting the handle-carrying end of the spit.

FIGURE 7 is a perspective view of the bracket shown in FIGURE 6.

FIGURE 8 is a fragmentary horizontal transverse sectional view taken substantially on the line 3—3 of FIGURE 2 but illustrating another form of support for the motor-engaging end of the spit.

Referring now by reference characters to the drawing which illustrates the preferred embodiment of the present invention, A generally designates an outdoor or so-called barbecue grill, including a conventional brazier tray 1, which normally mounts an annular grill 2, and which is provided with a suitable support (not shown) which may be mobile.

Presented in overlying relationship to grill 2, and brazier tray 1, is a hood 3, as fabricated preferably of sheet metal and being of parti-drum shape having a side wall 4 of slightly greater than hemi-cylindrical contour and a top plate 5, said wall 4 forming continuously the side and rear portions of said hood 3. Hood 3 is open to the front, as at 6; the marginal portions of side wall 4 on either side of front opening 6 are turned outwardly to form facings 7, 7' and are thence turned inwardly for abutment on their free edge against the outer face of side wall 4, thereby providing an extension of generally triangular cross section for reinforcement purposes. For rigidifying hood 3 and completing the front appearance thereof, there is provided a top trim member 8, extending transversely across the forward edge of top plate 5, and having enlarged lateral portions 8' for securement as by rivets upon the upper end portions of facings 7, 7', respecitvely. In their lower edge portions, facings 7, 7' are provided with upwardly opening notches as at 9, 9', respectively, for engaging a peripheral rolled edge 10 formed on brazier tray 1 for stabilizing hood 3 in position of use.

Mounted upon facing 7, substantially intermediate its length, is an angle bracket 11, having one flange 12 secured flatwise upon said facing 7, and the other flange 13 of which projects forwardly beyond front opening 6, and is provided with an upwardly opening notch 14 having a rounded base portion 14'.

Mounted upon facing 7' in registering relationship with bracket 11 is a support member 15 which incorporates a flange 16 disposed flatwise against facing 7' and secured thereto such as by rivets; there being a section 7 planarwise normal to flange 16 and projecting forwardly from the outer edge thereof in parallel relationship to flange 13 of bracket 11.

At its forward end section 17 is continuous as through a reverse bend 18 with an outer, parallel portion 19, which extends rearwardly beyond flange 7'. Section 17 is provided with an upwardly opening notch or recess 20 which is aligned with an upwardly opening recess 21 in section 19, said openings 20, 21 being also aligned with notch 14 of bracket 11. The vertical axis of opening 21 is at an acute angle to the horizontal and on opposite sides of said opening 21, section 19 is provided with relatively shallow recesses 22, 22' of like contour and size for purposes presently appearing.

Support member 15 is suitably formed at one end portion of a continuous band or strip, indicated generally 23, which progresses from the rearward end of section 19 for a predetermined distance about the adjacent side and rearward portion of side wall 4. In pre-selected portions, band 23 is provided with sections 24, 25 presented spacedly outwardly of side wall 4; there being increments of said band 23 between sections 25 and 24, and sections 24 and 19, which are secured directly to the outer face of side wall 4 as by means of rivets 26.

Said sections 24, 25 are provided substantially intermediate of their length with an upwardly opening recess 27, 28 respectively, of the same configuration as recess 21 in section 19. Each of such sections 24, 25 on opposite sides of the respective notch 27, 28 is provided with a pair of relatively shallow recesses 29, 29' and 30, 30' which latter correspond in size and configuration to recess 22, 22' of section 19. Side wall 4 is provided with apertures 31, 32 for alignment with notches 27, 28 of sections 24, 25. Band 23 is mounted on hood 3 at the same height as bracket 11, so that notch 14 in the latter bracket is in registration with apertures 31, 32 and their respective aligned notches 27, 28, respectively, as well as with notch 20 and recess 21 as above stated.

Provided for supporting an article of food to be cooked by use of grill A, is a spit 33 being of circular cross section and formed on such radius for reception within notches 21, 24 and 28, being freely extensible through the respective companion openings 20, 31 and 32. At one of its ends, spit rod 33 mounts a handle 34 with the other end being free for reception within a coupling element of a conventional spit drive unit or motor, indicated in phantom lines at 35. The radius upon which the base portion 14' of recess 14 is formed is slightly greater than that of the cross section of spit rod 33, whereby the region of the latter adjacent handle element 34 may be supportedly received therein with adequate clearance for smooth rotation upon energization of drive unit 35 and for allowing of a limited lateral swinging for purposes presently appearing.

Spit rod 33 is of such length as to project through openings 17, 31 or 32 for bearing supportingly upon the related notches 21, 27 and 28, with the projecting portions being engaged within the drive unit coupling element (not shown).

Drive unit 35 incorporates a pair of ears (not shown) which are receivable within the pairs of relatively small recesses, that is 22, 22', 29, 29', 30, 30' of band section 19, 24, 25, respectively, for permitting of stable yet detachable mounting of said drive unit on each of said sections to allow of effective operation of spit rod 33 in any of its positions of use.

In view of the foregoing, it will be seen that at the election of the user, spit rod 33 may be presented for extension between bracket 11 and any one of the supporting sections 19, 24, 25. In order to alter the position of spit rod 33, the user need merely disengage spit rod 33 from the coupling element of drive unit 35 such as by withdrawing said spit rod 33; lift drive unit 35 to disengage the mounting ears. By manipulation of handle element 34, spit rod 33 may be swung for projection through any one of the openings 20, 31 or 32 and for reception within the companion notch. Drive unit 35 is then re-engaged to spit rod 33 and suitably mounted on the related support section.

Accordingly, supports for the motor engaging end of spit rod 33 are so uniquely related to bracket 11 that the spit rod 33 may be presented in varying relationships to the radiant surface of the grill 2 for a predesired purpose. For example, with spit rod 33 extending between bracket 11 and support section 19, said rod 33 will be located outwardly of hood 3, and forwardly, as it were, of the radiant surface or central portion of tray 1, so as to permit of relative cooling of the food mounted upon spit 33 or in the alternative to subject same to a low cooking speed. With spit 33 extending between bracket 11 and band section 24, the same will substantially coincide with the diameter of grill 2 and extend across the hottest portion of the cooking area. In this position, the food upon spit rod 33 will be cooked at a relatively elevated rate.

With spit rod 33 extending between bracket 11 and support section 25, the food thereon will be disposed relatively rearwardly within hood 4 and thus be disposed in a highly warm environment, but yet be removed from the hottest portion of the cooking surface. In this location, the food may be preserved in a warm state pending eventual serving.

In view of the foregoing, it is apparent that the present invention uniquely provides an arrangement for multi-positioning of the food carrying spit rod without incorporation of extraneous mounting means. Spit rod 33 may be easily moved from position to position, without causing a lifting of the same and with full security of the food carried thereon.

Referring now to FIGURES 6 and 7, 11' designates another form of bracket for supporting the handle-carrying end of spit 33 and which may be used in lieu of bracket 11 above described. Said bracket 11' is of hinge character comprising a mounting leaf 51 and a spit-receiving leaf 52, said leaves each having a plurality of knuckles, as at 53, for engaging a pintle 55 whereby said leaves may be swung relatively to each other. As may best be seen in FIGURE 6, leaf 51 extends through a slot-like opening 55 formed in hood side wall 4 for abutment against the inner face of facing 7 and being fixed thereto as by rivets 56 and the like. Said leaf 51 is of such length that pintle 54 may be located immediately proximate the inner edge of flange 7 so that leaf 52 may be swung toward and away from facing 7. Extending downwardly from the upper edge of leaf 52 is a generally U-shaped recess 57 and on its lower outer edge is provided with an indentation 58 for receiving the user's finger, thumb nail, or the like to effect movement of said leaf 52. The hinge joint provided by knuckle 53 and pintle 54 may be relatively "stiff" so as to allow leaf 52 to remain substantially fixed in its selected swung position.

Thus, in use, with the head-carrying end portion of spit 33 supported in recess 57, leaf 52 may be suitably pivoted so as to allow alignment of recess 57 with the particular selected support for the motor engageable end of spit 33.

With attention now being directed to FIGURE 8, it will be seen that support member 15, which is shown as being integral so that sections 17 and 19 are continuous, may be, if desired, replaced by a two-part construction comprising a support bracket 59 and an outer element 60. Bracket 59 is of angle shape having one leg 61 thereof projecting through an opening 62 in the reinforcing flange of facing 7' for abutment against the rearward face of said facing 7' and being rigidly secured thereto as by rivets 63. The other leg 63 of said bracket 59 will project forwardly of facing 7' in planar normal relationship thereto, and carrying the various recesses present in forward section 17 as above described. Outer element 60, which corresponds to portion 19 above described, abuts against the lateral face of leg 64 of bracket 59 and is fixed thereto in any suitable manner as by rivets, welding, or the like, said device 60 being structurally similar to portion 19 above described and forming the forward end of a band or strip 23' corresponding structurally and functionally to band 23 above described.

It should be understood that changes and modifications in the formation, construction, arrangement, and combination of the several parts of the grill may be made and substituted for these herein shown and described without departing from the nature and principle of my invention.

Having thus described my invention, what I claim and desire to secure by Letters Patent, is:

1. For use with a barbecue grill, the improvement comprising a hood having a parti-annular side wall, a first spit support provided on one side portion of said side wall, a plurality of spaced-apart, circumferentially arranged spit supports provided on the opposed portion of said side wall, and a spit provided for engagement in one end portion on said first spit support and with the other end portion being selectedly received in one of the said plurality of spit supports.

2. For use with a barbecue grill, the improvement comprising a hood having a parti-annular side wall, said hood having parallel forward and vertically presented first and second front end portions, first and second support brackets mounted respectively on said first and second front end portions, a spit provided for extension between said front end portions and being adapted for supported reception within said first and second brackets, spit supporting means provided on said side wall circumferentially spaced from said second bracket whereby said spit may be selectedly presented for extension between said first and second support brackets or between said first bracket and said support means.

3. For use with a barbecue grill, the improvement comprising a hood having a parti-annular side wall, said hood having vertically presented first and second front end portions, a support bracket mounted on each of said first and second front end portions and projecting forwardly therefrom, a spit, said brackets being adapted for supporting said spit for extension of the same therebetween, a plurality of openings provided in said side wall adjacent said second front end portion and being in horizontal alignment with the bracket mounted on said second front end portion, said openings being dimensioned for extension of one end portion of said spit therethrough, spit-end receiving means mounted on said side wall radially outwardly of said openings whereby said spit may optionally extend across said hood between said bracket on said first end portion and the companion bracket of said openings.

4. For use with a barbecue grill, the improvement as defined in claim 3, and further characterized by a spit drive unit, means for engaging one end of said spit with said spit drive unit, and means associated with said bracket on said second front end portion and said spit, and receiving means for mounting said drive unit.

5. For use with a barbecue grill, the improvement as defined in claim 3, and further characterized by said bracket on said first front end portion having an upwardly opening recess of greater cross section than said spit.

6. For use with a barbecue grill, the improvement as defined in claim 4, and further characterized by said spit drive unit having ears and said bracket on said second front end portion and said spit-end receiving means having recesses for detachably engaging said spit drive unit ears.

7. For use with a barbecue grill, the improvement as defined in claim 2, and further characterized by said hood being formed of sheet material, the front end portions of said hood being turned outwardly to define flat facing portions and being thence turned inwardly for abutment of the margin thereof against the outer face of said side wall for presenting a rigidifying front end portion.

8. For use with a barbecue grill, the improvement as defined in claim 7, and further characterized by said brackets being mounted upon the facing portions and having flanges planarwise perpendicular thereto, said flanges having upwardly opening recesses for receiving said spit.

9. For use with a barbecue grill, the improvement as defined in claim 8, and further characterized by the bracket mounted on the facing portion of the second front end portion being continuous at its forward end with a continuous strip member directed rearwardly therefrom, means engaging said strip at spaced points to the outer face of said hood side wall, said strip being formed to define said spit, and receiving means at spaced locations throughout its length.

10. For use with a barbecue grill, the improvement as defined in claim 1 and further characterized by said first spit support being hingedly mounted on one side portion of said side wall for aligned disposition with the selected spit support on the opposed portion of said side wall.

11. For use with a barbecue grill, the improvement comprising a hood having a parti-annular side wall, a first spit support provided on one side portion of said side wall, a plurality of spaced-apart, circumferentially arranged, horizontally aligned, spit supports provided on the opposed portion of said side wall, and a spit provided for engagement in one end portion of said first spit support and with the other end portion being selectedly received in one of the said plurality of spit supports.

12. For use with a barbecue grill, the improvement comprising a hood having a parti-annular side wall, said hood having vertically presented first and second front end portions, a support bracket mounted on each of said first and second front end portions and projecting forwardly therefrom, a spit, said brackets being adapted for supporting said spit for extension of the same therebetween, a plurality of openings provided in said side wall adjacent said second front end portion and being circumferentially arranged and rearwardly of the bracket mounted on said second front end portion, said openings being dimensioned for extension of one end portion of said spit therethrough, spit-end receiving means mounted on said side wall radially outwardly of said openings whereby said spit may optionally extend across said hood between said bracket on said first end portion and the companion bracket of said openings.

13. For use with a barbecue grill, the improvement comprising a hood having a parti-annular side wall, said hood having aligned forward and vertically presented first and second front end portions, the front end portions of said hood being turned outwardly to define flat facing portions and being thence turned inwardly for abutment of the margin thereon against the outer face of said side wall for presenting a rigidifying front end portion, first and second brackets mounted respectively on said first and second front end portions, said brackets being mounted upon the facing portions and having flanges planarwise perpendicular thereto, a spit provided for extension between said front end portions and being adapted for supported reception within said first and second brackets, said flanges having upwardly opening recesses for receiving said spit, spit supporting means provided in said side wall proximate said second bracket, whereby said spit may be selectedly presented for extension between said first and second support brackets or between said first bracket and said support means.

14. For use with a barbecue grill, the improvement as defined in claim 13 and further characterized by the bracket mounted on the facing portion of the second front end portion being continuous at its forward end with a continuous strip member directed rearwardly therefrom, means engaging said strip at spaced points to the outer face of said hood side wall, said strip being formed to define said spit, and receiving means at spaced locations throughout its length.

References Cited

UNITED STATES PATENTS

| | | | |
|---|---|---|---|
| 2,842,044 | 7/1958 | Kirk | 99—421 XR |
| 2,894,447 | 7/1959 | Persinger et al. | 99—421 XR |
| 3,168,862 | 2/1965 | Clouser | 99—421 |
| 3,173,358 | 3/1965 | Linquist | 99—421 |
| 3,188,940 | 6/1965 | Oatley | 99—421 |
| 3,257,937 | 6/1966 | Mell | 99—421 |

WALTER A. SCHEEL, *Primary Examiner.*

A. O. HENDERSON, *Assistant Examiner.*